May 27, 1941.   P. W. KLIPSCH ET AL   2,243,428
ELECTRICAL PROSPECTING
Filed Oct. 8, 1937
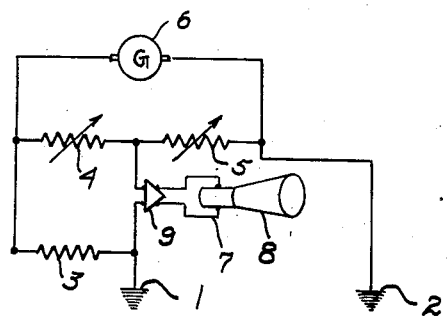
Fig.1.
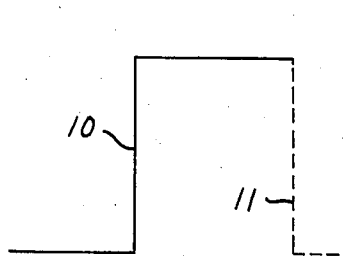
Fig.2.   Fig.3.   Fig.4.
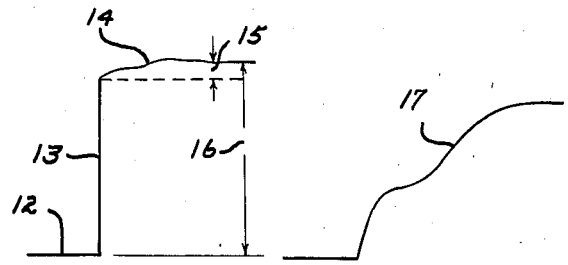
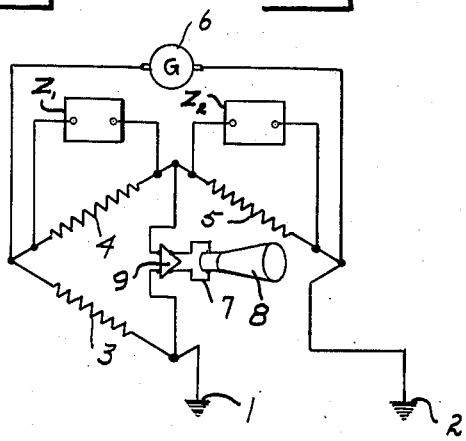
Fig.5.
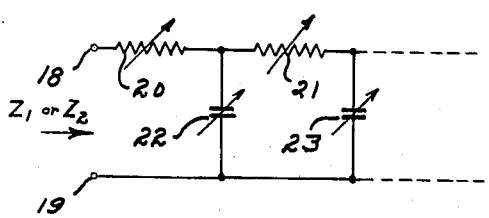
Fig.6.
PAUL W. KLIPSCH
SOLOMON BILINSKY
INVENTORS.
BY
ATTORNEYS.

Patented May 27, 1941

2,243,428

UNITED STATES PATENT OFFICE 2,243,428

ELECTRICAL PROSPECTING

Paul W. Klipsch and Solomon Bilinsky, Houston, Tex., assignors to E. E. Rosaire, Houston, Tex.

Application October 8, 1937, Serial No. 167,925

6 Claims. (Cl. 175—182)

This invention relates to exploration for buried deposits or anomalous geologic structure by utilizing currents which vary with time such as periodic currents of simple or complex wave form, alternating currents, or transients, and studying the change in wave form resulting from the passage of such current through the earth.

Heretofore transient methods have been described by Blau in United States Patents Nos. 1,911,137 and 2,079,103 and alternating current methods by West in co-pending application Serial No. 103,129 filed September 29, 1936, for method of Subsurface prospecting. The present invention employs the same physical and geophysical principles in a new manner which avoids some of the difficulties experienced in the practice of these prior inventions.

An object of the present invention is to provide method and apparatus for electrical exploration in which are used a smaller number of electrodes, namely two in place of the previous four or six, and hence the necessity of laying a plurality of wire lines is avoided.

Another object is to enable placing the generating and detecting equipment at the same point during normal operation, avoiding the need for additional vehicles.

An object is to utilize the same generator for producing the earth current and for comparison with the detected potential thereby avoiding the errors and inconvenience caused by the use of two separate generators.

An important object is that of making performance independent of minor variations in detector characteristics such as changes in amplifier gain, and frequency and phase distortion.

Natural earth current transients and power line interference have offered serious difficulties in the past; an object of the present invention is to obviate or greatly reduce these obstacles.

Another object is to provide means for cancelling out purely surface effects such as wire fences, pipe lines, surface water and/or the presence of other electrically anomalous bodies which tend to obscure phenomena from which geological data may be interpreted.

Specifically, an object of this invention is to provide means for causing a current to flow in the earth and simultaneously in a variable circuit, for detecting the potential between points in the network thus formed, for adjusting the variable parts of the network until a null is obtained, and for interpreting geological data from the network adjustments and the character of the residual potential detected after balance.

Another object is to produce a record of the wave form of the residual potential after the steady part of the wave has been balanced out, or after balancing both the steady part and a known amount of the time varying part.

Advantages which the present invention possesses over previous attempts to use time-varying electrical phenomena for exploration may well be classed as objects of this invention. The present invention uses preferably a single oscillation source whereas the most successful prior methods used two or more, necessitating means for synchronization, and great care in design, construction and maintenance to be assured that the plurality of oscillation sources all had the same wave shape. As the two generators were sometimes connected to different amplifiers before balancing, the differences in the two amplifier characteristics were sources of error. Generally, the noise produced by transients in the natural earth currents tended to mask the information sought.

All of these difficulties are at least in part eliminated. A single oscillation source produces a given wave shape and current from it in one circuit can be directly compared with current in another circuit. Detection takes place after balancing, not before, so that dissimilar amplifiers are not involved. The noise has been found to be negligible compared with the generated currents even for smaller currents than were used in the older methods.

The invention will be best understood by reference to the accompanying drawing in which:

Fig. 1 is a schematic diagram of the invention in its simplest form.

Fig. 2 illustrates one form of electrical impulse which may be used.

Fig. 3 shows the earth current wave form which results from the potential impulse of Fig. 2; and Fig. 4 shows the time variant component of Fig. 3 after the steady current has been subtracted or balanced out.

Fig. 5 shows an alternative circuit means.

Fig. 6 shows a type of impedance found to be useful for producing closely approximate balances.

In the drawing illustrating the invention the numerals 1 and 2 indicate electrodes which are embedded in the earth. Referring specifically to Fig. 1 resistors 3, 4 and 5 are interconnected in a manner to form arms of a bridge network, connected to a source of electrical energy 6. Potential detecting means generally designated as 7 comprises a suitable indicating instrument, such as an oscillograph, or oscilloscope 8 and its associated amplifier and operating mechanism 9.

The generator 6 may supply simple D. C. transients, either singly or repeated, or periodic or alternating impulses of any arbitrary wave form.

For the potential detecting means 7 we prefer to use a cathode-ray oscilloscope 8 and an amplifier 9. Permanent records may be made by photographing the fluorescent screen of oscilloscope 8. Alternatively, a mechanical oscillograph may be used, preferably with means provided for visual observation as well as for recording.

For the purpose of explaining the operation of the invention, it will be assumed that the wave form of the generated potential is that shown by the trace 10 in Fig. 2, which may or may not be repeated, as shown by dotted lines 11, to form an intermittent or periodic current.

Regarding only that portion of the generated potential which can be regarded as a single (unrepeated) transient or the part 10 of the impulse shown in Fig. 2, the current in the earth which results from the impulse may be qualitatively represented by the curve in Fig. 3, parts of which are designated as 12, 13 and 14. However, obviously, an oscillograph would not show much of the effect of the earth on the flow of current, or part 14 of the curve as the amplitude 15 of this portion of the curve is substantially always less than 1% of the total amplitude 16. This variation would be considerably smaller than the width of the trace produced by an oscillograph. By subtracting out a suitable amount of a wave whose shape is that of Fig. 2, that is an amount equal to the portion 13 in Fig. 3, only the residual unbalance remains, and after suitable amplification provides a wave trace as shown at 15 in Fig. 4.

The subtraction process just mentioned is accomplished by suitably adjusting arms 4 and 5 of the bridge, which deducts a potential from that appearing across terminals 1 and 2. This function is well known in the art of making impedance bridge measurements. The residual part 14 in Fig. 3, or 17 in Fig. 4, then stands alone, unmodified, except by subsequent amplification.

Figs. 2, 3 and 4 represent experimental data. The amplitude change of portion 14 of the curve of Fig. 3, as already pointed out, is ordinarily very small compared to the total amplitude of curve portions 13 and 14. Its magnitude can, however, readily be measured by balancing out the steady part 13. Ordinarily the transient represented by portion 14 has an amplitude 15 which is of the order of 50 decibels down from the steady value of 13 and 14, or combined amplitude 16.

By way of explanation, the impedance between the electrodes 1 and 2 may be represented by $$Z = R_0 + R(t) \quad (1)$$

where Z is the impedance, $R_0$ is a constant resistance, principally that of the earth in the immediate vicinity of the electrodes, and $R(t)$ is a function of time and is consequently a time-variant impedance. From completed analyses it appears that for periodically varying currents $$R(t) = (a + jb) \sin \omega t \quad (2)$$

where $a$, $b$ are undetermined constants, $\omega$ is the angular velocity expressed by $\omega = 2\pi f$ where $f$ is the frequency, $j = \sqrt{-1}$ and $\pi = 3.1416 \ldots$ For indicial conditions relative to purely transient potentials, $$R(t) = h \cdot t \quad (3)$$

where $h$ is an undetermined constant and $t$ is time. If the resistances 3, 4 and 5 of Fig. 1 be denoted $R_3$, $R_4$, $R_5$, the impressed potential produced by the source 6 is $E_0$ and the instantaneous potential detected by 7 is E then $$\frac{E}{E_0} = \frac{R_4 R_0 - R_3 R_5 + R_4 R(t)}{[R_3 R_0 + R(t)] - [R_4 + R_5]} \quad (4)$$

By suitably adjusting $R_4$ and $R_5$, $$\frac{E}{E_0} = \frac{R_4 - R(t)}{[R_3 + R_0 + R(t)](R_4 + R_5)} \quad (5)$$

The function $R(t)$ in the denominator is negligible compared to $R_0 + R_3$ so that, at balance, $$\frac{E}{E_0} = \frac{R(t)}{\text{a constant}} \quad (6)$$

or $$R(t) = \text{a constant} \times \frac{E}{E_0} \quad (7)$$

The nature of $R(t)$, that is, the manner in which $R(t)$ varies with time, and its magnitude are dependent upon geological structure and constitute particularly sensitive indicators of the presence of faults and anomalous conditions.

Equations 4 to 7 inclusive, were derived for the case where $E_0$ is a transient applied voltage of the unit function type, but the same equations hold for any wave form of $E_0$. Obviously when steady conditions are reached, i. e. when $R(t)$ has reached a constant value, the transient may be repeated. Thus, a generated voltage may be transient or intermittent or even periodic. By consideration of the relationship between such electrical conditions and periodic currents which are either unidirectional or alternating, of either simple or complex wave form, it is obvious from the teachings expressed in the Fourier analysis and the Fourier integral, that there is no fundamental difference between "periodic" and "transient" states; there is simply a different mathematical concept involved.

Thus the oscillation potential suitable for the practice of this invention may be a transient, periodic unidirectional impulses, or periodic alternating impulses of arbitrary wave form. In view of the fact just mentioned, we choose to call the applied potential or the current it produces a time-varying potential or current, the terms "time-varying" being interpreted to mean any potential or current which varies with time in a suitable manner.

In the practice of the invention, we prefer to use a periodic potential of nearly rectangular wave form, either alternating or unidirectional; in some cases such a potential whose maximum amplitude is smaller than that of a steady direct current potential on which it is superposed is preferable. We have found 25 to 50 cycles to be suitable; the principal and sinusoidal frequency of, say 50 cycles, represents a fundamental, and if the wave is truly rectangular, other frequencies are present in the form of harmonics according to the Fourier series:

$$(E(t) = E_0 (\sin \omega t + \frac{1}{3} \sin 3\omega t + \frac{1}{5} \sin 5\omega t \ldots) \quad (8)$$

Other wave shapes may be used and may prove advantageous. Thus suppression of harmonics beyond, say the 9th or 11th, sometimes proves desirable from practical standpoints.

So far stress has been laid on measuring distortion of a wave which contains several harmonics. The distortion is principally in the form of different attenuation of the different terms in Equation 8. It is therefore possible to make the measurements at different frequencies individually. Instead of using a wave which simultaneously contains a plurality of frequencies like the square wave, we can use sinusoidal waves, and at any individual frequency we may measure the amplitude of the residual unbalance.

An alternative form of the device of the invention is shown in Fig. 5 wherein the resistors 4 and 5 are provided with parallel impedances $Z_1$ and $Z_2$, details of which are illustrated in Fig. 6. For use with sine waves we resort to a modification of Fig. 5 in which only one impedance $Z_1$ or $Z_2$ is used, and that impedance becomes a simple reactance branch instead of the ladder illustrated in Fig. 6.

In the use of the circuit of this alternative form, instead of measuring the amplitude and character of $R(t)$ by observing the residual unbalance, $Z_1$ and $Z_2$ are adjusted until the residual itself is nullified, and the constants of the impedances are then used to describe $R(t)$.

The impedances illustrated in Fig. 6 are shown arranged as ladders for the reason that it appears from theoretical consideration especially Equation 2, that $R(t)$ varies with time in much the same manner as the indicial impedance of a cable does, and Fig. 6 shows artificial cable networks which exhibit the same two terminal impedance characteristics. The impedance between terminals 18 and 19 of such a ladder can be made to have a value which varies with frequency in accordance with Equation 2. To vary the impedance level, architrave resistance arms 20 and 21 may be varied, or pillar capacitor arms 22 and 23 may be adjusted. Experimentally it has been found that the residual unbalance can be reduced 20 decibels or more by suitable adjustments of $Z_1$ and $Z_2$ so that first order characteristics of $R(t)$ can be described in terms of the properties or constants of $Z_1$ and $Z_2$ and second order characteristics of $R(t)$ can be determined from the second order residual unbalance.

We prefer to plot profiles of the magnitude of $R(t)$, or of suitable constants of $Z_1$ and $Z_2$, (such as the ratio R/C) against profile distances. Anomalous geology then shows up as high or low regions. From the nature or wave shape of $R(t)$, it is sometimes possible to deduce the nature of the geological anomaly. In any case, the knowledge of the mere presence of the anomaly is significant in the search for buried deposits. Such knowledge at least indicates the economical employment of an exploration method of higher resolving power. Evidence that $R(t)$ is useful in locating anomalies is presented by a traverse over a known formation, the wave form of the impedance function changing markedly in progressing from a nonanomalous to an anomalous region.

Field technique may involve visual observation and measurement of the detected potential produced by $R(t)$, or it may be preferable to make a permanent record as by photography whereby the results may be returned to a central computing point for calculation and/or analysis. Where mechanical analysis is to be used, the record may be made in the form of a variable area or variable density strip similar to a sound track. Alternatively, a record may be made by photographing the image on the fluorescent screen of a cathode ray oscilloscope. Thus, the indicating means may consist of an oscilloscope or an oscillograph, and in the appended claims it is intended that the word oscillograph where used means either.

An alternative field procedure may involve inductive instead of conductive coupling to the earth. Instead of using electrodes embedded in the earth as conductive means of producing the earth current, a coil of suitable dimensions may be used as the primary of a transformer, the earth acting as a secondary. The terminal impedance of the coil can then be the measured quantity, and variations from an established normal interpreted as anomalous geological conditions.

Still another alternative consists of capacitive coupling of the measuring circuit to the earth, consisting of insulated conducting plates in proximity to the earth at points where electrodes would otherwise be used.

It should be noted that effects due to polarization near the electrodes are appreciable at some frequencies. However, results indicate that such effects may safely be neglected at frequencies which we find preferable to employ.

The invention claimed is:

1. The method of electrical exploration which comprises connecting electrodes embedded in the earth so that the impedance between them forms an arm of a bridge network, applying time-varying potential to appropriate diagonal points in the bridge, detecting the magnitude and wave shape of the potential across another diagonal pair of points in the bridge and balancing the bridge with resistance and impedance until the detected wave form has negligible amplitude over at least an appreciable period of time, whereby the values of resistance and impedance used to produce the balance may be utilized for geological interpretation.

2. The method of geophysical exploration comprising the steps of causing an electric impulse of potential of predetermined wave shape to flow simultaneously between two electrodes embedded in the earth, and through a pure resistance, whereby two potentials are produced, one of which has the wave shape of the impulse of potential and the other the wave shape of the resulting earth current as modified by its passage through the earth, superposing said potentials in opposition so that the potential across the pure resistance is subtracted from the potential across the earth electrodes, and observing the residual transient potential as an indication of subsurface conditions.

3. The method of electrical exploration which comprises connecting electrodes embedded in the earth so that the earth between them forms an arm of a bridge network, applying a potential of selected wave form to appropriate diagonal points of the bridge, whereby an electrical pulse is generated in the earth between said electrodes, arranging means across another diagonal pair of points of the bridge in such a way as to include the earth arm to indicate the magnitude and wave shape of the potential across said points, opposing to the pulse developed in the earth arm a pulse having the same wave form as the applied potential and observing the difference between said pulses.

4. The method of electrical exploration which comprises connecting electrodes embedded in the earth so that the earth between them forms an arm of a bridge network, applying to appropriate diagonal points of the bridge a potential of square wave form, whereby there is generated in the earth between said electrodes a pulse having an instantaneous value followed by a value which changes with time, arranging means across another diagonal pair of points of the bridge to indicate the magnitude and wave shape of the potential across said points, opposing to the pulse developed to the earth arm a pulse having a square wave form, the instantaneous value of which is the same as the instantaneous value of the pulse generated in the earth arm, and observing the difference between said pulses.

5. A method according to claim 3 in which the difference between the pulses is amplified before observation.

6. A method according to claim 4 in which the difference between the pulses is amplified before observation.

SOLOMON BILINSKY.
PAUL W. KLIPSCH.